United States Patent
Chung-Ju et al.

[11] Patent Number: 6,067,287
[45] Date of Patent: May 23, 2000

[54] NEURAL FUZZY CONNECTION ADMISSION CONTROLLER AND METHOD IN A NODE OF AN ASYNCHRONOUS TRANSFER MODE (ATM) COMMUNICATION NETWORK

[75] Inventors: Chang Chung-Ju; Cheng Ray-Guang; Lu Kuen-Ruey; Lee Hong-Yuh, all of Hsinchu, Taiwan

[73] Assignee: Accton Technology, Taiwan

[21] Appl. No.: 08/929,718

[22] Filed: Sep. 15, 1997

[51] Int. Cl.[7] .................................. H04J 1/16; H04J 3/14
[52] U.S. Cl. .......................... 370/232; 370/235; 370/252
[58] Field of Search .................................. 370/232, 229, 370/230, 233, 234, 235, 252, 253, 395, 236, 254, 255, 410, 412, 413, 414, 415, 417, 422, 438, 397, 399, 428, 429, 469

[56] References Cited

U.S. PATENT DOCUMENTS

| | | | |
|---|---|---|---|
| 5,179,556 | 1/1993 | Turner | 370/94.1 |
| 5,341,366 | 8/1994 | Soumiya et al. | 370/17 |
| 5,519,689 | 5/1996 | Kim | 370/232 |
| 5,737,313 | 4/1998 | Kolarov et al. | 370/234 |
| 5,784,358 | 7/1998 | Smith et al. | 370/230 |
| 5,802,040 | 9/1998 | Park et al. | 370/232 |
| 5,812,526 | 9/1998 | Chang et al. | 370/230 |
| 5,872,771 | 2/1999 | Park et al. | 370/252 |

OTHER PUBLICATIONS

Ray–Guang Cheng and Chung–Ju Chang, "Design of a Fuzzy Traffic Controller for ATM Networks," *IEEE/ACM Trans Networking*, vol. 4, No. 3, pp. 460–469 (Jun. 1996).

*Primary Examiner*—Douglas W. Olms
*Assistant Examiner*—Phirin Sam
*Attorney, Agent, or Firm*—Madson & Metcalf

[57] ABSTRACT

A neural fuzzy connection admission controller and method is provided for controlling admission of a new connecting call in a node of a communication network. The neural fuzzy connection admission controller is an inference engine based on a multi-layered neural fuzzy network. The neural fuzzy connection admission controller provides a decision signal $\hat{Z}$ in response to an available bandwidth capacity $C_a$, a congestion control action y and a cell loss ratio $P_l$. Since the decision signal $\hat{Z}$ is obtained via a learning process, so the decision is closer to a desired result.

19 Claims, 7 Drawing Sheets

NEURAL FUZZY CONNECTION ADMISSION CONTROLLER AND METHOD IN A NODE OF AN ASYNCHRONOUS TRANSFER MODE (ATM) COMMUNICATION NETWORK

FIELD OF THE PRESENT INVENTION

The present invention relates to a connection admission control scheme for an ATM traffic controller, especially to a neural fuzzy connection admission control (NFCAC) scheme for an ATM traffic controller.

BACKGROUND OF THE INVENTION

ATM (asynchronous transfer mode) is an essential technology for integrating multimedia services in high-speed networks. Because of bursty traffic characteristics and various quality of service (QoS) as well as bandwidth requirements for these multimedia services, an ATM network must have an appropriate connection admission control (CAC) scheme to guarantee the QoS for existing calls as well as to achieve high system utilization.

Conventional CAC schemes that utilize either capacity estimation or buffer thresholds suffer from some fundamental limitations. One of the limitations is the difficulty for a network to acquire complete statistics of input traffic. As a result, it is not easy to accurately determine the effective thresholds or equivalent capacity in various bursty traffic flow conditions of ATM networks. Also, these conventional schemes have optimal solution only under steady state. A control scheme which dynamically regulate traffic flows according to changing network conditions, however, requires understanding of its dynamics. The rationale and principles underlying the nature and choice of thresholds or equivalent capacity under dynamic conditions are unclear. Networks are forced to make a decision based on the incomplete information and therefore the decision process is full of uncertainty. Thus, due to the unpredictable statistical fluctuations of the system, decision error will always be accompanied with these control schemes and result in performance degradation.

Recently, fuzzy logic systems have been widely applied to deal with the CAC related problems in ATM network (R. G. Cheng and C. J. Chang, "Design of a fuzzy traffic controller for ATM networks," *IEEE/ACM Trans. Networking,* vol. 4, no. 3, pp. 460–469, June 1996). The results reveal that fuzzy set theory could provide a robust mathematical framework for dealing with "real-world" imprecision and the fuzzy approach exhibits a soft behavior which means to have a greater ability to adapt to dynamic, imprecise, and bursty environment (R. G. Cheng and C. J. Chang, "Design of a fuzzy traffic controller for ATM networks," *IEEE/ACM Trans. Networking,* vol. 4, no. 3, pp. 460–469, June 1996). In (R. G. Cheng and C. J. Chang, "Design of a fuzzy traffic controller for ATM networks," *IEEE/ACM Trans. Networking,* vol. 4, no. 3, pp. 460–469, June 1996), a fuzzy traffic controller which simultaneously incorporates CAC and congestion control was proposed. Comparative studies show that the proposed fuzzy approaches significantly improve the system performance over the conventional approaches. However, it is found that there is still no clear and general technique presented to map the existing knowledge on traffic control to those design parameters of a fuzzy logic controller. In order to ease the design procedure and to have a better control result, self-learning capability should be deployed in the fuzzy logic controller.

Self-learning capability of the neural network has been applied to characterize the relationship between the input traffic and the system performance. Simulation results showed that neural networks have several valuable properties (i.e., adaptive learning, high computation rates due to the massive parallelism of the hardware implementation, generalization from learning, and high degree of fault tolerance due to distributed processing) for implementing ATM traffic control. Actually, the conventional CAC, fuzzy-logic-based CAC, and neural-net-based CAC schemes have their benefits in dealing with CAC. The conventional CAC, based on a mathematical analysis, provides robust solutions for different kinds of traffic environment but suffers from drawbacks of estimation error (due to modeling) and approximation error (due to the requisite calculations in real time) and is not suitable for dynamic environments. The fuzzy-logic-based CAC is excellent in dealing with real-world imprecision and has a greater ability to adapt to dynamic, imprecise, and bursty environment, but lacks the learning capability to automatically construct its rule structure and membership functions to achieve optimal performance. The neural-net approach provides the learning and adoption capability which could reduce the estimation error of conventional CAC and achieve optimal performance of fuzzy logic controller, however, the knowledge of conventional methods may not be easily adopted in the design of neural networks.

U.S. Pat. No. 5,179,556 proposed a traffic control mechanism directed to prioritizing cells for selected transmission depending on whether or not the cells are part of a burst. A source of cells "encodes" the cells to indicate whether the cells are at the start, middle or end of a train of cells in a burst. Lone cells not part of a burst are not encoded. Each node has a state machine associated with each outgoing link. The state machine determines whether or not to block or transmit received cells. (The state machine can only have two states: block or transmit). The state machine decodes each encoded cell and used the burst codes as a basis for permitting a transition from one state to another. That is, a state machine can transition from the blocking state to the transmit state, or vice versa, only at the beginning or end of a burst, not in the middle of a burst. This patent also proposed a connection admission control mechanism which uses a single threshold to determine whether or not to admit a new communication to a node. The problem with this patent is that traffic load are difficult to predict thus making it difficult to establish appropriate criterion (i.e. thresholds) for determining when to transition from a transmit state to a blocking state or when there is available capacity to support new communication at a node.

U.S. Pat. No. 5,341,366 proposed to use fuzzy logic and fuzzy set theory in congestion control and admission control. Fuzzy logic and fuzzy sets can best be explained in comparison to ordinary logic and sets. In ordinary logic, each constant and logical predicate may have only one of the two values, namely, true or false (or 0 or 1). In logic, each constant and predicate may have a whole continuum of values between true and false or 0 and 1. These values represent a possibility between 0 and 1 that the corresponding fuzzy logic constant or predicate is true. Likewise, in ordinary set theory, a predicate function can be defined over a group of set elements which determines whether or not a set element is contained in a given set with absolute certainty. A mathematical expression which converts values to such possibilities is referred to as a membership function. Membership functions can be continuous or can be discrete with plural quantum levels. U.S. Pat. No. 5,341,366 uses fuzzy logic to control the admission of new communications at a node. However, there does not exist a general and clear technique to design the fuzzy logic controller. Moreover, the controller is hard to adjust itself to adapt to dynamic environment.

SUMMARY OF THE INVENTION

The present invention discloses a neural fuzzy connection admission control (NFCAC) scheme, which utilizes the linguistic control capabilities of the fuzzy logic controller and the learning abilities of the neural-net, for an ATM traffic controller. Fuzzy logic systems have been successfully applied to deal with traffic control related problems and have provided a robust mathematical framework for dealing with "real-world" imprecision; however, there is no clear and general technique to map the existing knowledge on traffic control to parameters of a fuzzy logic system. Neural networks has learning and adaptive capabilities to construct computational intelligent algorithms for traffic control; however, the knowledge of conventional methods may not be easily adopted in the design of neural networks. The proposed NFCAC is an integrated connection admission control (CAC) that combines their benefits and solves their difficulties. It can automatically construct the rule structure and the membership functions by learning the training examples itself. Moreover, NFCAC provides rich information about the way it works and is easy to be trained. Simulation results show that the proposed NFCAC saves a large amount of training time, simplifies the design procedure, and provides a superior system utilization, while keeping the QoS construct, over both the neural network and the fuzzy logic system.

The present invention proposes a neural fuzzy connection admission control (NFCAC) scheme for an ATM traffic controller. NFCAC adopts fuzzy implementations for the equivalent capacity method and the buffer thresholds method. Such an integrated neural fuzzy system can automatically construct the rule structure by learning the training examples itself and can self-calibrate the parameters of membership functions. It can provide excellent capability in dealing with real-world imprecision and show rich information about the way it works; it can be trained easily and enhance the system utilization. It is a computational intelligent method that can be the answer to many challenges of designing a coherent call admission control strategy for an ATM traffic controller. Simulation results show that the system utilization of the proposed NFCAC can further improve about 10% of the system utilization comparably with the fuzzy-logic-based CAC proposed in (R. G. Cheng and C. J. Chang, "Design of a fuzzy traffic controller for ATM networks," *IEEE/ACM Trans. Networking*, vol. 4, no. 3, pp. 460–469, June 1996), and NFCAC only requires a fraction of $10^3$ order of training cycles consumed by the neural-net-based CAC.

In accordance with the present invention, a connection admission control (CAC) process for controlling admission of a new connecting call in a node of a communication network comprising: (a) determining an available capacity; (b) obtaining a traffic load adjustment parameter from the congestion controller; (c) calculating the cell loss rate of the node; and (d) evaluating a fuzzy logic control rule for the available capacity, the parameter and the cell loss rate to output an admission control signal for making a decision of accepting or rejecting the new call.

In accordance with another aspect of the present invention, the available capacity of the node is estimated by a bandwidth estimator of the node.

In accordance with another aspect of the present invention, the traffic load adjustment parameter is obtained by a congestion controller of the node.

In accordance with another aspect of the present invention, a buffer thresholds method is employed to regulate a traffic flow of an incoming source of the new connecting call according to the traffic load adjustment parameter.

In accordance with another aspect of the present invention, the cell loss rate of the node is estimated by a system parameter estimator of the node.

In accordance with another aspect of the present invention, the cell lose rate is a system performance feedback to indicate a controlled performance of a network operation for the communication network.

In accordance with another aspect of the present invention, the available capacity is a residual bandwidth value of the node, which is evaluated as the new connecting call is issued.

In accordance with another aspect of the present invention, the fuzzy logic control rule is performed by a neural fuzzy connection admission controller (NFCAC) including: first layer nodes for respectively inputting and storing three input parameters of the available capacity, the traffic load adjustment parameter and the cell loss rate; second layer nodes forming a fuzzifier for at first fuzzifying the three input parameters by a membership function, and then outputting a fuzzified result; third layer nodes forming the fuzzy logic control rule for receiving and operating the fuzzified result generated from the second layer nodes, and outputting a fuzzy control signal; fourth layer nodes executing two operations for performing a consequence by the fuzzy control rule to provide a soft admission decision signal; fifth layer nodes forming a defuzzifier to receive and defuzzify the soft admission decision signal, and accordingly outputting a desired decision signal, in order to decide whether the new connecting call should be admitted for connection or not.

The present invention may best be understood through the following description with reference to the accompanying drawings, in which:

BRIEF DESCRIPTION OF THE DRAWINGS

FIG. 3(*b*) is a diagrams showing the respective Membership functions of a preferred embodiments of a type-2 traffic according to the present invention;

FIG. 4(*b*) is a plot showing a Cell loss rate of a preferred embodiment of a type-2 traffic according to the present invention;

FIG. 5(*b*) is a plot showing a System utilization for a preferred embodiment of a type-2 traffic according to the present invention;

FIG. 5(*c*) is a plot showing a System utilization for a preferred embodiment of a total traffic according to the present invention;

Figure 1:
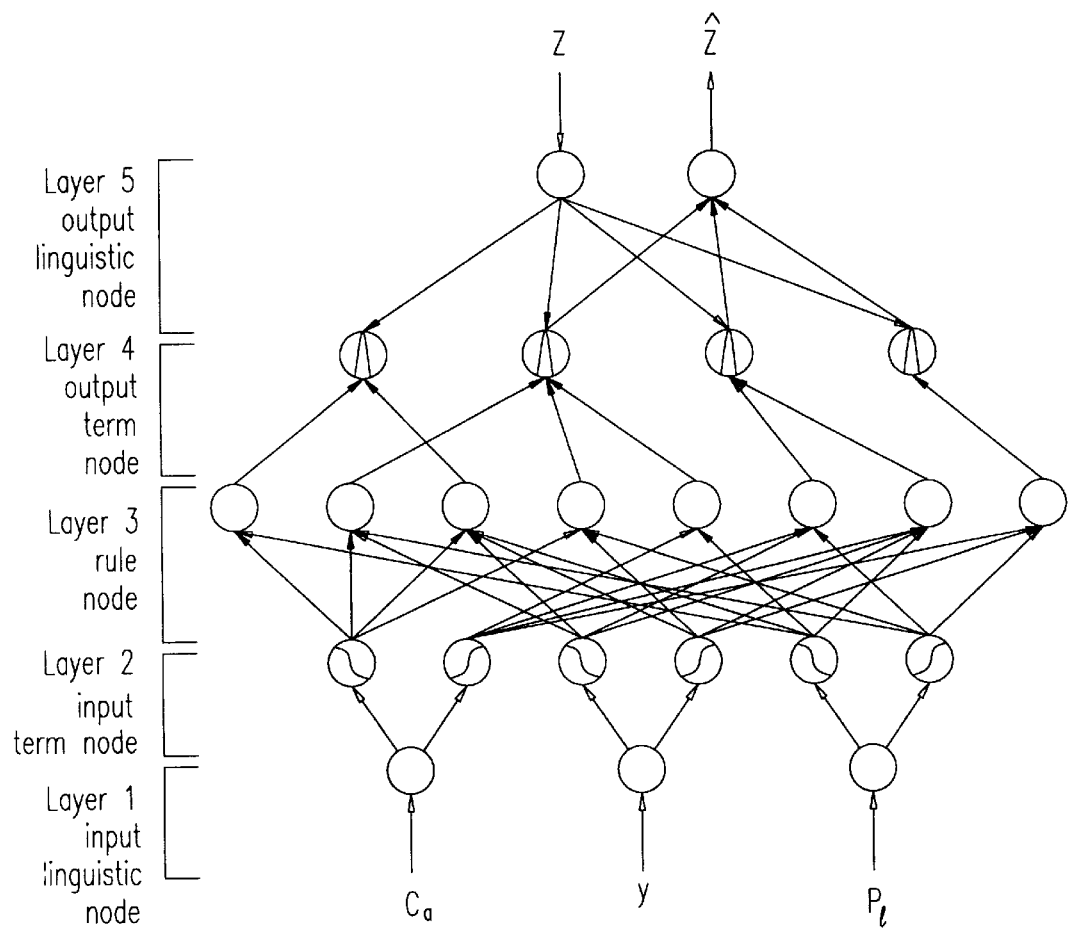
FIG. 1 is a schematic diagram showing a preferred embodiment of a neural fuzzy connection admission controller according to the present invention.

DEFINITIONS $P_l$: cell loss ratio y: congestion control action $C_a$: available capacity q: queue length $\Delta$ q: queue-length change rate Z: desired decision $\hat{Z}$: decision signal

DETAILED DESCRIPTION OF THE PREFERRED EMBODIMENT

The present invention will now be described more specifically with reference to the following embodiments. It is to be noted that the following description of the preferred embodiments of the present invention are presented herein for purpose of illustration and description only; it is not intended to be exhaustive or to be limited to the precise form disclosed.

A fuzzy set F in an universe of discourse U is characterized by a membership function which takes values in the interval [0, 1]. A linguistic variable x in U is defined by $T(\chi)=\{T_\chi^1, T_\chi^2, \ldots, T_\chi^k\}$ and $M(\chi)=\{M_\chi^1, M_\chi^2, \ldots, M_\chi^k\}$, where $T(\chi)$ is a term set of $\chi$, i.e., a set of terms $T_\chi^i$ with membership function $M_\chi^i$ defined on U, and $M(\chi)$ is a semantic rule for associating each term with its meaning.

A fuzzy logic controller has functional blocks of a fuzzifier, a defuzzifier, and an inference engine containing a fuzzy rule base. The fuzzifier is a mapping from observed m-dim input $\chi_i$ to fuzzy set $T_{\chi_i}^{k_i}$ with degree $M_{\chi_i}^{k_i}$, i=1, ..., m. The fuzzy rule base is a control knowledge-base characterized by a set of linguistic statements in the form of "if-then" rules that describe a fuzzy logic relationship between m-dim inputs $\chi_i$ and n-dim outputs $z_j$. The inference engine is a decision-making logic that acquires the input linguistic terms of $T(\chi_i)$ from the fuzzifier and uses an inference method to obtain the output linguistic terms of $T(z_i)$. The defuzzifier adopts a defuzzification function to convert $T(z_i)$ into a non-fuzzy value that represents decision $z_j$.

A multi-layer feedforward neural network is a layered network which consisting of an input layer, an output layer, and at least one hidden layer. Each hidden layer consist of nonlinear processing elements, called nodes. Nodes in two adjacent layers are fully interconnected with variable link weights. The output of a node in one layer multiplied by the link weight becomes the input of a node in the next layer. Each node forms a weighted sum of its inputs and generates an output according to a predefined activation functions a(•). Consider a feedforward network NN(X, W) with an input vector X and a set of weight vector W which will be updated by some learning rules. It is desired to train NN(X, W) (actual output) to approximate a desired output function g(X) as close as possible. The Stone-Weierstrass theorem showed that for any continuous function g ∈ C(D) with respect to X and a compact metric space C(D), an NN(X, W) with appropriate weight W can be found such that $\|NN(X, W)-g(X)\|_X < \epsilon$ for an arbitrary $\epsilon > 0$, where $\|e\|_X = \Sigma_{X \in D}\|e(X)\|^2$ and $\|\cdot\|$ is a vector norm.

A neural film controller is an integration of the fuzzy logic system and the neural network. The integration brings the low-level learning and computation power of the neural network into the fuzzy logic system, and provides the high-level, humanlike thinking and reasoning of fuzzy logic system into the neural network.

The neural fuzzy controller is in a form of a multi-layer network that realizes a fuzzy logic system. This invention adopts a five-layer neural fuzzy controller to design the CAC scheme. As shown in FIG. 1, nodes in layer one are input linguistic nodes. Two kinds of output linguistic nodes are used in layer five. One is for training data (desired output) to feed into this net and the other is for decision signal (actual output) to be pumped out of this net. Nodes in layer two and layer four are term nodes which act as membership functions of the respective linguistic variables. Nodes in layer three are rule nodes; each node represents one fuzzy rule and all nodes in layer three form a fuzzy rule base. Links in layer three and layer four function as an inference engine—layer-three links define preconditions of the rule nodes and layer-four links define consequences of the rule nodes. Links in layer two and layer five are fully connected between linguistic nodes and their corresponding term nodes.

Figure 2:
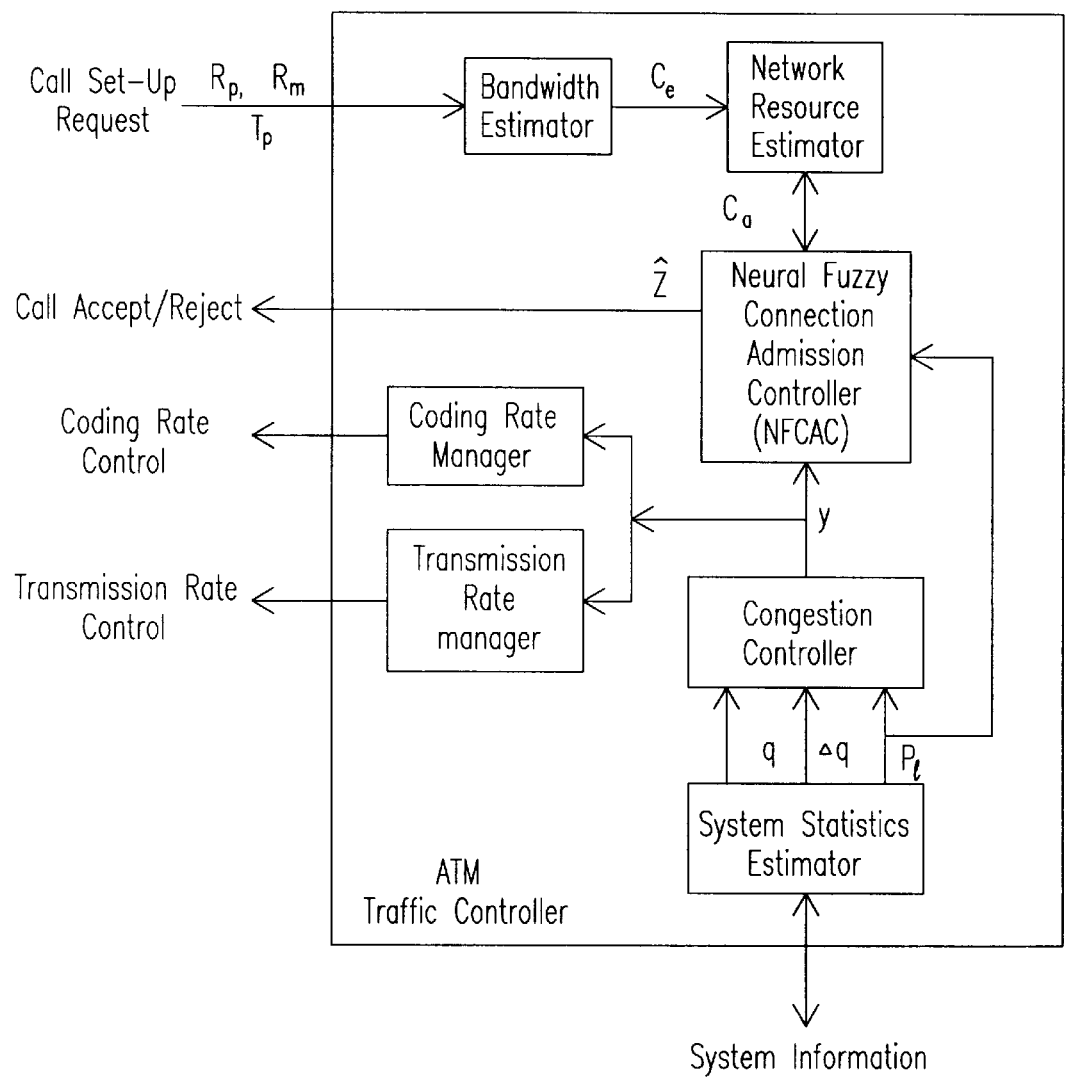
FIG. 2 is a block diagram showing a possible realization of an ATM traffic controller according to the present invention.

The functional block diagram of an ATM traffic controller is shown in FIG. 2. The System Statistics Estimator 28 measures system statistics of the queue length q, the queue-length change rate $\Delta$ q, and the cell loss probabilities $p_1$ for type-1 and type-2 traffic. The Congestion Controller 25 may generate a congestion control action y according to the measured system statistics. The Coding Rate Manager 26 and Transmission Rate Manager 27, associated with the congestion controller, are respectively used to perform a function of input rate reduction for type-1 and type-2 traffic during congestion period. The Bandwidth Estimator 22 estimates the equivalent capacity $C_e$ required for a new connection from its traffic parameters such as peak bit rate (PBR), average bit rate (ABR), and peak bit rate duration (PBRD), denoted by $R_p$, $R_m$ and $T_p$, respectively. The Network Resource Estimator 23 does the accounting for system-resource usage. When a new connection with bandwidth $C_e$ is accepted, the new value of $C_a$ is updated by subtracting $C_e$ from the old value of $C_a$. On the contrary, when an existing connection bandwidth $C_e$ is disconnected, the new value of $C_a$ is updated by adding $C_e$ to the old value of $C_a$. $C_a$ is initially set to 1. The Neural Fuzzy Connection Admission Controller 29 employs NFCAC scheme to deal with the CAC procedure and sends a decision signal $\hat{z}$ back to the new connection to indicate acceptance or rejection of the new call request.

NFCAC use an available capacity $C_a$, a traffic load adjustment parameter y, and a cell loss rate $p_1$ as input linguistic variables. The available capacity $C_a$ is obtained from a conventional CAC method known as the equivalent capacity method. The equivalent capacity method transforms the traffic characteristic (usually described by three traffic parameters of peak bit rate, average bit rate, and mean peak rate duration) of a new call into an unified metric, called equivalent bandwidth, to reduce the dependence of the traffic types and the proposed control mechanism. Such a transformation can greatly simplify the dimension of the NFCAC and save a large percentage of learning time. The traffic load adjustment parameter is generated by a congestion controller 25. The congestion control is so correlated with the CAC that should be taken into account. One of the most often used congestion control method is the buffer thresholds method, where congestion is alarmed when the queue length exceeds some pre-defined threshold. The network congestion is then averted by regulating the traffic flow of the incoming sources according to the traffic load adjustment parameter. The cell loss rate acts as a system performance feedback to indicate the controlled performance of network operation via NFCAC.

NFCAC has a net input function $f_i^{(k)}(u_{ij}^{(k)})$ and an activation output function $a_i^{(k)}(f_i^{(k)})$ for node i in layer k, where $u_{ij}^{(k)}$ denotes the possible input to the node i in layer k form node j in layer (k-l). They are accordingly set as:

Layer 1: There are three input nodes which have their respective input linguistic variables of $C_a$, y and $p_1$. Define $$f_i^{(1)}(u_{ij}^{(1)}) = u_{ij}^{(1)}, \text{ and } a_i^{(1)} = f_i^{(1)}, \qquad (1)$$

where $u_{11}^{(1)} = C_a$, $u_{22}^{(1)} = y$, $u_{33}^{(1)} = p_1$, $1 \leq i \leq 3$.

Layer 2: The nodes in this layer are used as the fuzzifier. From the knowledge of the CAC methods proposed in the literature (R. G. Cheng and C. J. Chang, "Design of a fuzzy traffic controller for ATM networks," *IEEE/ACM Trans. Networking*, vol. 4, no. 3, pp. 460–469, June 1996), the term to describe remaining capacity available for a new connection is either "Enough" or "Not Enough", thus the term set for the available capacity is defined as $T(C_a) = \{$Not Enough (NE), Enough (E)$\}$. The system is in either congestion state (y is "Negative") or in congestion-free state ("y is Positive"), the term set for the congestion control action is defined as $T(y) = \{$Negative (N), Positive (P)$\}$. The terms used to describe the cell loss rate, which is one of the dominant QoS requirement, is either "Satisfied" or "Not Satisfied" and thus the term set of cell loss rate is defined as $T(p_1) = \{$Satisfied (S), Not Satisfied (NS)$\}$. Thus we set six nodes in this layer. Each node performs a bell-shaped function defined as $$f_i^{(2)}(u_{ij}^{(2)}) = -\frac{(u_{ij}^{(2)} - m_{jn}^{(1)})^2}{\sigma_{jn}^{(1)2}} \text{ and } a_i^{(2)} = e^{f_i^{(2)}}, \qquad (2)$$

where $$u_{ij}^{(2)} = a_j^{(1)}, 1 \leq i \leq 6, j = \left[\frac{i+1}{2}\right],$$

and $m_{jn}^{(1)}$ and $\sigma_{jn}^{(1)}$ are the mean and the standard deviation of the n-th term of the input linguistic variable from node j in input layer, respectively, n=1 if i is the odd node and n=2 if i is the even node.

Layer 3: The links perform precondition matching of fuzzy control rules. According to fuzzy set theory, the fuzzy rule base forms a fuzzy set with dimensions $|T(C_a)| \times |T(y)| \times |T(p_1)|$ (Denote $|T(\chi)|$ to be the number of terms in $T(\chi)$). Thus, there are eight rule nodes in this layer. Each rule node performs the fuzzy AND operation defined as $$f_i^{(3)}(u_{ij}^{(3)}) = \min(u_{ij}^{(3)}; \forall j \in P_i) \text{ and } a_i^{(3)} = f_i^{(3)}, \qquad (3)$$

where $u_{ij}^{(3)} = a_j^{(2)}$ and $P_i = \{j| \text{ all j that are the precondition nodes of the i-th rule}\}$, $1 \leq i \leq 8$.

Layer 4: The nodes in this layer have two operation modes: down-up and up-down. In the down-up operation mode, the links perform consequence matching of fuzzy control rules. In order to provide a soft admission decision, not only "Accept" and "Reject" but also "Weak-Accept" and "Weak Reject" are employed to describe the accept/reject decision. Thus, the term set of the output linguistic variable $\hat{z}$ is defined as $T(\hat{z}) = \{$Reject (R), Weak Reject (WR), Weak Accept (WA), Accept (A)$\}$. We set four nodes in this layer. Each node performs the fuzzy OR operation to integrate the fired strength of rules which have the same consequence. Thus, we define $$f_i^{(4)}(u_{ij}^{(4)}) = \max(u_{ij}^{(4)}; \forall j \in C_i) \text{ and } a_i^{(4)} = f_i^{(4)}, \qquad (4)$$

where $u_{ij}^{(4)} = a_j^{(3)}$ and $C_i = \{j \mid \text{ all j that have the same consequence of the i-th term in the term set of } \hat{z}\}$, $1 \leq i \leq 4$. The up-down operation mode is used during the training period. The nodes in this layer and the links in layer five have similar functions to those in layer two. Each node performs a bell-shaped function defined as $$f_i^{(4)}(u_{ij}^{(4)}) = -\frac{(u_{ij}^{(4)} - m_j^{(0)})^2}{\sigma_j^{(0)2}} \text{ and } a_i^{(4)} = e^{f_i^{(4)}}, \qquad (5)$$

where $u_{ij}^{(4)}$ is set to be $a_j^{(5)}$ obtained form up-down operation nodes in layer five, and $m_j^{(0)}$ and $\sigma_j^{(0)}$ are the mean and the standard deviation of the j-th term of $\hat{z}$, respectively, $1 \leq i \leq 4, j=1$.

Layer 5: There are two nodes in this layer. One node performs the down-up operation for the actual decision signal $\hat{z}$. The node and its links act as the defuzzifier. The function used to simulate a center of area defuzzification method is approximated by $$f_i^{(5)}(u_{ij}^{(5)}) = \sum_{j=1}^{4} m_j^{(0)} \sigma_j^{(0)} u_{ij}^{(0)} \text{ and } a_i^{(5)} = U\left(\frac{f_i^{(5)}}{\sum_{j=1}^{4} \sigma_j^{(0)} u_{ij}^{(5)}} - z_a\right) \qquad (6)$$

where $u_{ij}^{(5)} = a_j^{(4)}$, i=1, $z_a$ is the decision threshold, and $$U(x) = \begin{cases} 1 & \text{if } x \geq 0, \\ 0 & \text{otherwise.} \end{cases} \qquad (7)$$

Clearly, $\hat{z} = a_1^{(5)}$ and a new connection will be accepted only if $\hat{z} = 1$. The other node performs the up-down operation during the training period. It feeds the desired decision signal z into the controller to optimally adjust the link weights.

For this kind of nodes, $$f_i^{(5)}(u_{ij}^{(5)}) = u_{ij}^{(5)}, \text{ and } a_i^{(5)} = f_i^{(5)} \qquad (8)$$

where i=j=1 and $u_{11}^{(5)} = z$.

According to the present invention, a preferred embodiment of a hybrid learning algorithm is applied to construct NFCAC. The algorithm is a two-phase learning scheme. In phase one, a self-organized learning scheme is used to construct the presence of the rules and to locate the initial membership functions. In phase two, a supervised learning scheme is used to optimally adjust the membership functions for desired outputs. To initiate the learning scheme, the size of the term set for each input/output linguistic variable, fuzzy control rules, and training data must be provided.

The training data involved in the input linguistic variables give a desired response z to train NFCAC to approximate a perfect call-acceptance decision boundary. For a new connection, a decision signal $\hat{z}$ is generated by NFCAC with inputs $C_a$, y and $p_1$. After a fixed time period T that the call set-up request is initiated, the desired output z can be obtained based on the performance feedback $p_1$. If the QoS is satisfied ($p_1 \leq$ QoS) during T, then the desired output z is set to be 1 to denote that the new connection should be accepted; otherwise, z is set to be 0 and new connection should be rejected. Here, the initial weights of NFCAC are designed so as to accept the new connections for efficient system utilization. Of course, it leads to the dissatisfactory of QoS at the beginning of the training process. However, the optimal boundary will be obtained by adjusting the weights of NFCAC with collected training data.

In the self-organized training phase, only slightly modification of the structure is needed if the initial structure of controller is constructed. In this invention, an initial form of the controller is first constructed, based on the knowledge disclosed in (R. G. Cheng and C. J. Chang, "Design of a fuzzy traffic controller for ATM networks," *IEEE/ACM Trans. Networking,* vol. 4, no. 3, pp. 460–469, June 1996). The rules could be slightly modified to construct a number of possible structures. Among all of the possible structures, a final structure that possess the minimum mean square error E for the training data is selected, where the error E is defined as $$E = \frac{1}{2}[z(t_i) - \hat{z}(t_i)]^2, \quad (9)$$

where $z(t_i)$ and $\hat{z}(t_i)$ are the desired output and the actual output obtained at time $t_i$, respectively. If the knowledge of the controller is not provided, an initial structure of the network could be constructed either via an genetic algorithm (GA) or via Kohonen's feature-maps algorithm and the N-nearest-neighbors to provide a rough estimate of the structure. Similarly, the structure which provides the minimum value of E will be chosen.

After the self-organized training phase, the fuzzy logic rules should be constructed, and NFCAC then enters into the supervised learning phase to adjust parameters of membership functions optimally. The aim of the supervised learning is to further minimize E for the training data using a back propagation learning algorithm. Starting at the output node, a backward pass is used to compute $\delta E/\delta \omega$ for all the hidden nodes in layer four and layer two. Assuming that $\omega$ is the adjustable parameter in a node (i.e. the mean or the standard deviation of the membership function), the general learning rule is $$\omega^{new} = \omega^{old} + \eta \frac{\partial E}{\partial \omega}, \quad (10)$$

where $\omega$ is the learning rate and $$\frac{\partial E}{\partial \omega} = \frac{\partial E}{\partial f}\frac{\partial f}{\partial \omega} = \frac{\partial E}{\partial a}\frac{\partial a}{\partial f}\frac{\partial f}{\partial \omega} \quad (11)$$

Here, different values of $\omega$ could be used in layer two and layer four to provide different learning rate for input and output variables. Different values of $\omega$ represent different adoption rates for these variables. $\omega=0$ is used if the membership function of a specific linguistic variable is not intended to be modified.

Assume that an ATM network containing an ATM traffic controller has two types of the input traffic: real-time (type-1) and no-real-time (type-2). Video and voice services are examples of type-1 traffic, while data services are examples of type-2 traffic. The network system supports two separate finite buffers with sizes $K_i$ for type-i traffic, i=1 and 2. When the buffer is full, incoming cells are blocked and lost. The system reserves $C_r$ portion of its capacity for type-1 traffic and the remaining (1–$C_r$) portion for type-2 traffic. When there is unused type-1 or type-2 capacity, it is used for the other type. In the simulations, $K_1=K_2=100$ cells and $C_r=0.8$. Also, QoS requirement for type-1 traffic is $QoS_1=10^{-5}$ and that for type-2 traffic is $QoS_2=10^{-6}$.

The cell generation process for a video coder is assumed to have two motion states: one is the low motion state for the rate of interframe coding and the other is the high motion state for the rate of intraframe coding. The rate of intraframe coding is further divided into two parts: the first part has the same rate as the interframe coding and the second part, called difference coding, is the difference rate between intraframe coding and interframe coding. The interframe coding and the difference coding are all modeled as discrete-state Markov-modulated Bernoulli processes (MMBP) with basic rates $A_r$ and $A_a$. Let $\lambda_a(t)$, $\lambda_y(t)$ and $\lambda'_a(t)$ denote the cell generation rates for intraframe coding, interframe coding, and difference coding at time t, respectively, form the video coder. Clearly, $\lambda_a(t)=\lambda_y(t)+\lambda'_a(t)$. The process of $\lambda_y(t)$ is an ($M_y+1$)-state birth-death Markov process. The state-transition diagram for $\lambda_y(t)$ uses the label $m_y A_y$ to indicate the cell generation rate of interframe coding of a state and uses the labels ($M_y-m_y$)y and $M_y\omega$ to denote the transition probabilities from state $m_y A_y$ to state ($m_y+1$)$A_y$ and from state $m_y A_y$ to state ($m_y-1$)$A_y$, respectively. Similarly, the process for $\lambda'_a(t)$ is an ($M_a+1$)-state birth-death Markov process. The state-transition diagram for $\lambda'_a(t)$ uses the label $m_a A_a$ to indicate the additional cell generation rate of a state due to intraframe coding and used the labels ($M_a-m_a$)$\phi$ and $m_a\psi$ to denote the transition probability from state $m_a A_a$ to state ($m_a+1$)$A_a$ and from state $m_a A_a$ to state ($m_a-1$)$A_a$, respectively. The video source will alternate between interframe and intraframe, depending on the video source activity factor. There is a transition rate c in the interframe state and a transition rate d in the intraframe state. The values of y, $\omega$, $M_y$, $A_\lambda$, $\phi$, $\psi$, $M_a$, $A_a$, c, and d can be obtained from the traffic variables of $R_p$, $R_m$ and $T_p$.

The cell generation process for a voice call is modeled by an interrupted Bernoulli process (IBP). During the ON (talk spurt) state, voice cells are generated with rate $A_v$; while during the OFF (silence) state, no cells are generated. A voice source has a transition rate $\alpha$ in the OFF state and has a transition rate $\beta$ in the ON state.

As for the data source, there are high-bit-rate and low-bit-rate data services. And the generations of high-bit-rate and low-bit-rate date cells are characterized by Bernoulli processes with rates $\theta_1$, and $\theta_2$, respectively. Also, the distributions of the holding times for video, voice, high-bit-rate date, and low-bit-rate date are assumed to be exponentially distributed.

In the simulations, for the arrival process of a video source, it is assumed that $R_p=3.31\times10^{-2}$, $R_m=1.10\times10^{-2}$ and $T_p=0.5$ second, which would give $M_r=M_a=20$, $A_r=1.34\times10^{-3}$, $A_a=3.15\times10^{-4}$, y=$3.77\times10^{-6}$, $\omega=5.65\times10^{-6}$, $\phi=\psi=2.83\times10^{-5}$, $c=5.65\times10^{-6}$ and $d=5.09\times10^{-5}$; for the arrival process of a voice source, it is assumed that $R_p=4.71\times10^{-4}$, $R_m=2.12\times10^{-4}$ and $T_p=1.35$ seconds, which would give $A_v=4.71\times10^{-4}$, $\alpha=1.71\times10^{-6}$ and $\beta=2.09\times10^{-6}$; for high-bit-rte data source, it is assumed that $R_p=7.36\times10^{-2}$, $R_m=7.36\times10^{-3}$ and $T_p=3.14\times10^{-2}$ second, which would give $\theta_1=0.1$, and for low-bit-rate date source, it is assumed that $R_p=3.68\times10^{-2}$, $R_m=7.36\times10^{-4}$ and $T_p=2.88\times10^{-2}$ second, which give $\theta_2=0.02$. The mean holding time is 60 minutes for a video service, 3 minutes for a voice service, 18 seconds for both high- and low-bit-rate data services. Notice that the values of $R_p$ and $R_m$ have been normalized by the network capacity.

TABLE 1

The rule structure for the NFCAC

| Rule | $C_a$ | y | $p_l$ | $\hat{z}$ |
|---|---|---|---|---|
| 1 | NE | N | NS | R |
| 2 | NF | N | S | WR |
| 3 | NE | P | NS | R |
| 4 | NE | P | S | WR |
| 5 | E | N | NS | WR |
| 6 | E | N | S | WA |
| 7 | E | P | NS | WA |
| 8 | E | P | S | A |

Two kinds of cell loss rate for type-i traffic is considered: the source loss rate due to selective discarding at the customer side $p_{n,i}$ is defined as $$p_{l,i} = \kappa p_{s,i} + p_{n,i}, \quad i=1, 2, \qquad (12)$$

where $\kappa$ is used to indicate the significance of the node loss rate over the source loss rate. $\kappa=0.8$ is here assumed because selectively discarding cells at the source should have less effect on information retrieval than blocking cells at the node.

Figure 3A:
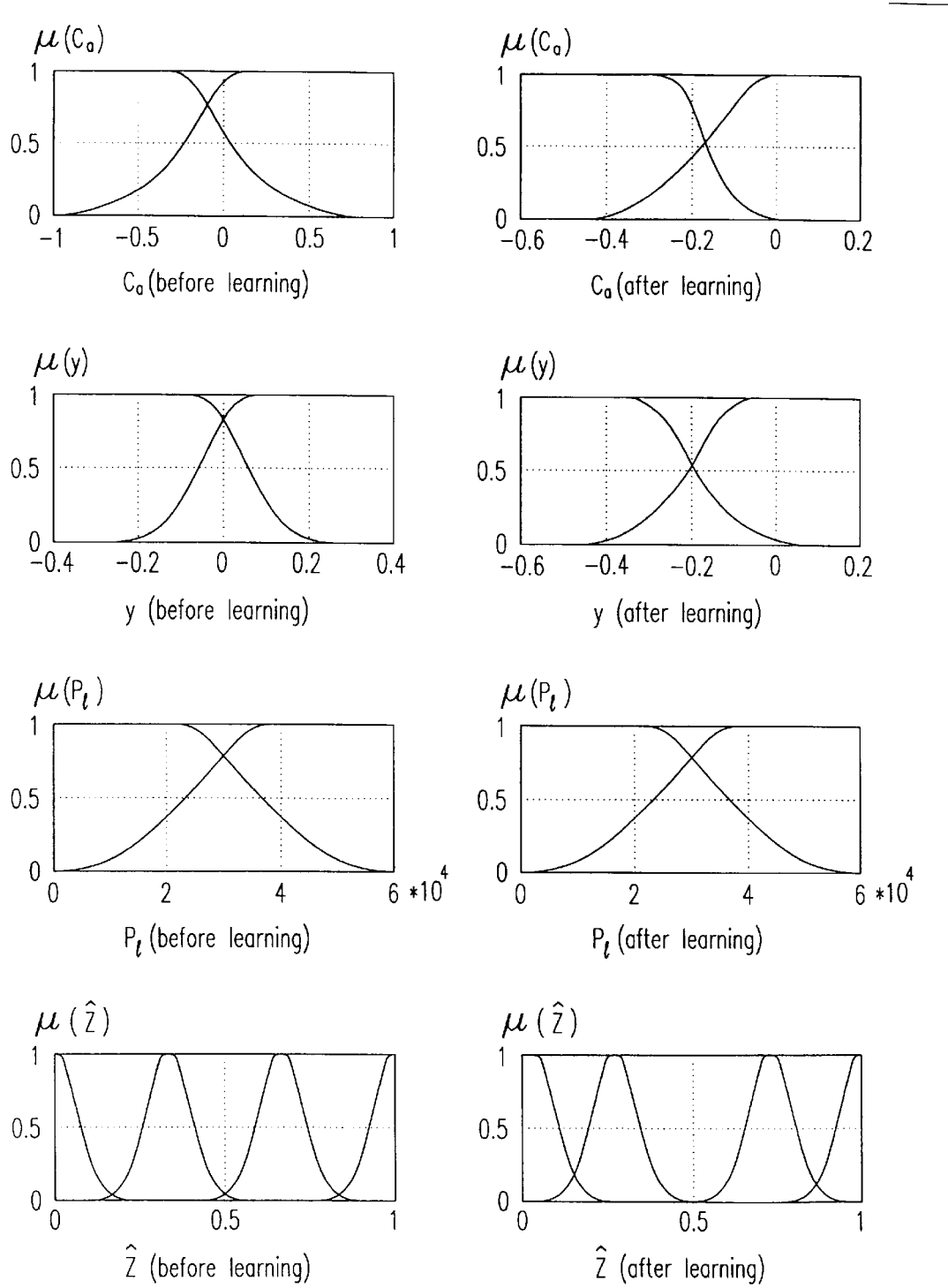
FIG. 3(*a*) is a diagram showing the respective Membership functions of a preferred embodiments of a tpye-1 traffic according to the present invention.
Figure 3B:
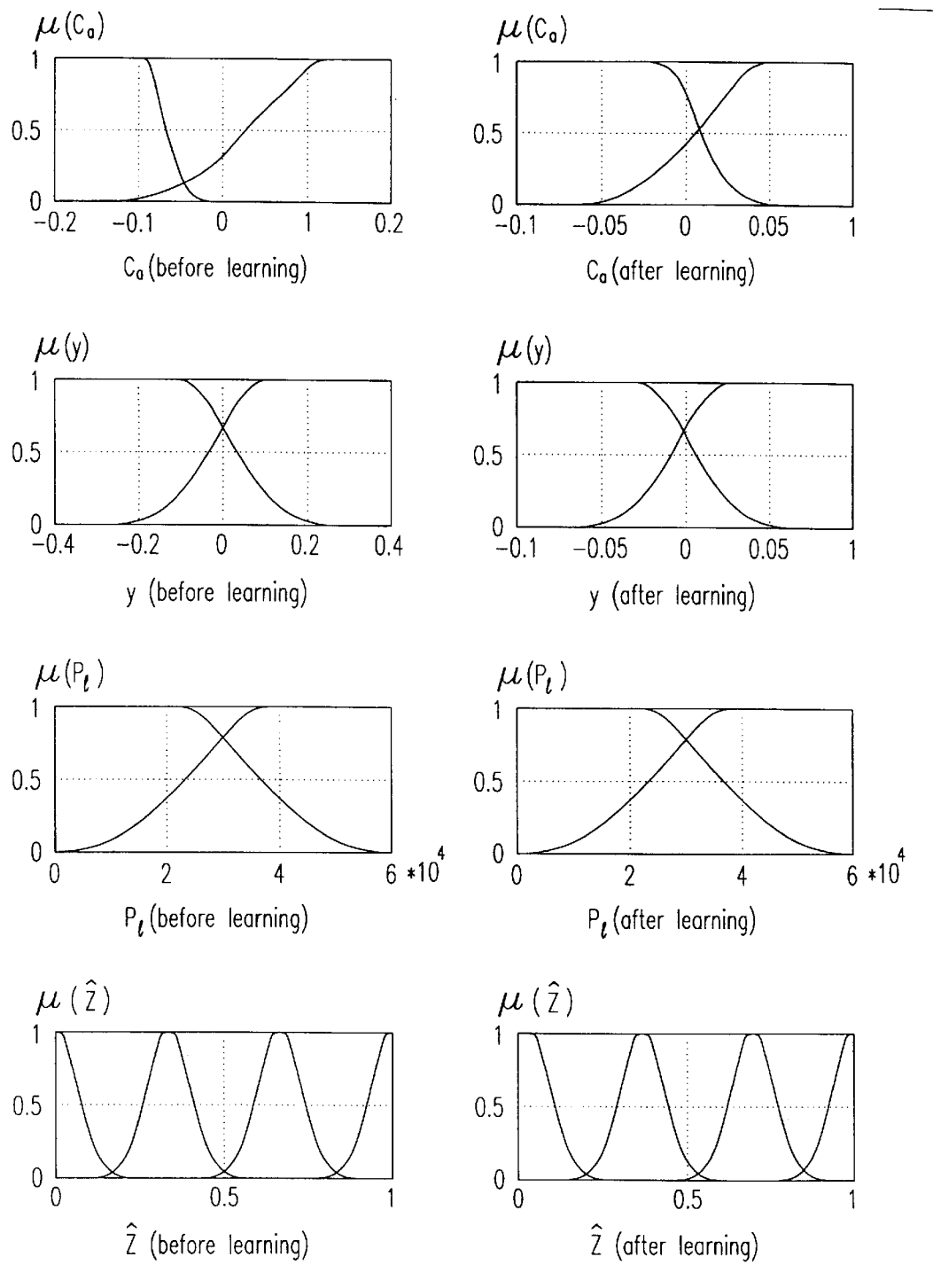

The rule structure and parameters of NFCAC were initially set and then adjusted via the learning algorithm. Here, GA was used in the self-organized learning phase and an optimal rule was obtained and shown in Table 1. When the fuzzy logic rules were found, the network entered into the supervised learning phase to adjust the membership functions optimally. Three different values of η were used for variables $C_a$, y, $p_l$ and $\hat{z}$. η was set to zero for $p_l$ because the membership functions were well chosen in [3] according to the given QoS requirement and no modification was needed. η=0.01 was used for $C_a$ and $\hat{z}$, and η=0.001 was used for y because the membership functions of y were initially optimized in (R. G. Cheng and C. J. Chang, "Design of a fuzzy traffic controller for ATM networks," *IEEE/ACM Trans. Networking*, vol. 4, no. 3, pp. 460–469, June 1996). The learned membership functions for type-1 and type-2 traffic were shown in FIG. 3(a) and FIG. 3(b), respectively.

Figure 4A:
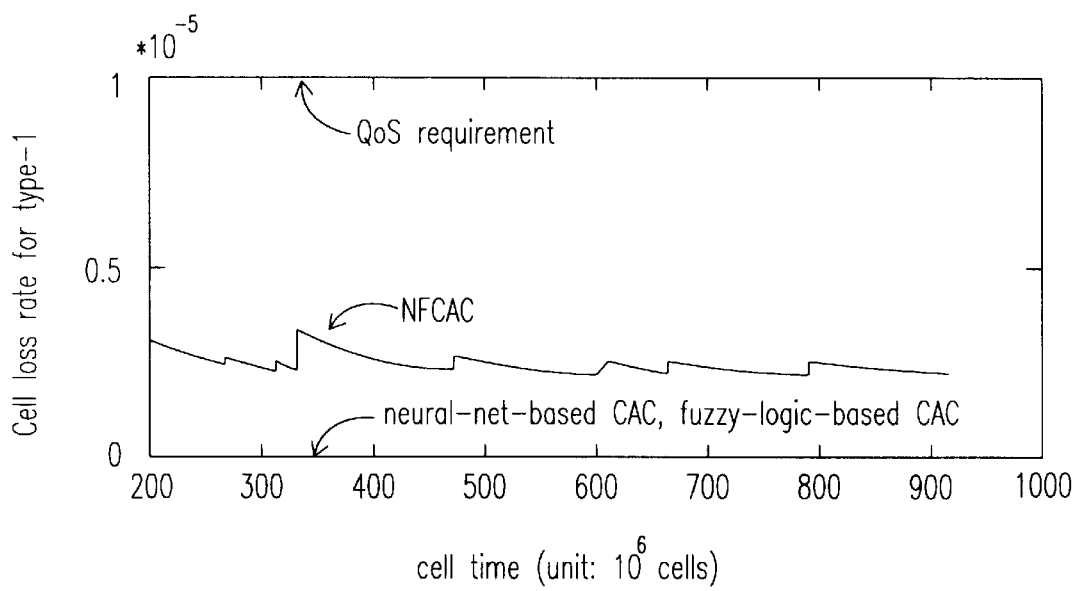
FIG. 4(*a*) is a plot showing a Cell loss rate of a preferred embodiment of a type-1 traffic according to the present invention.
Figure 4B:
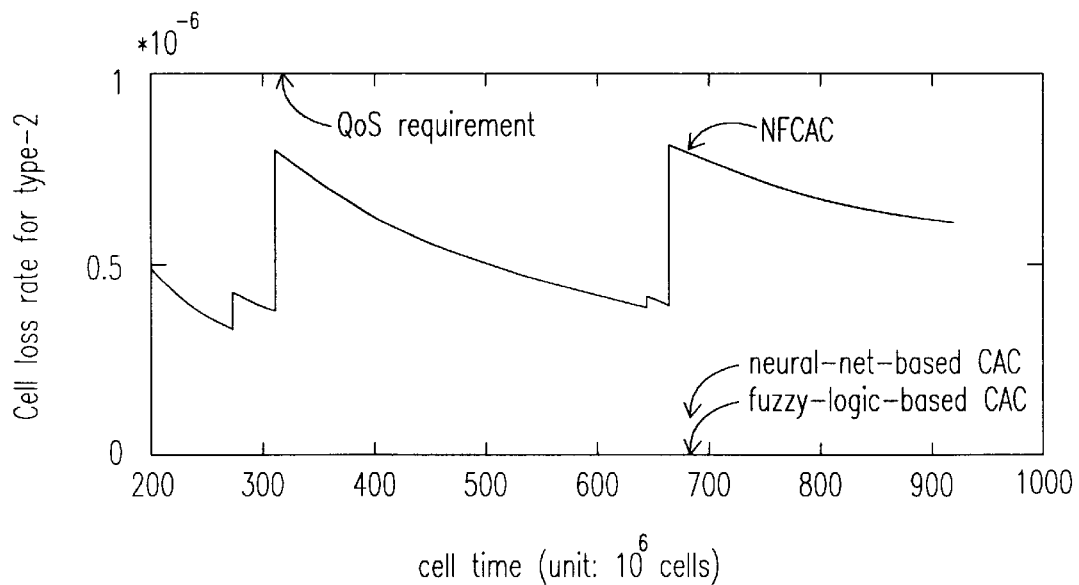
Figure 5A:
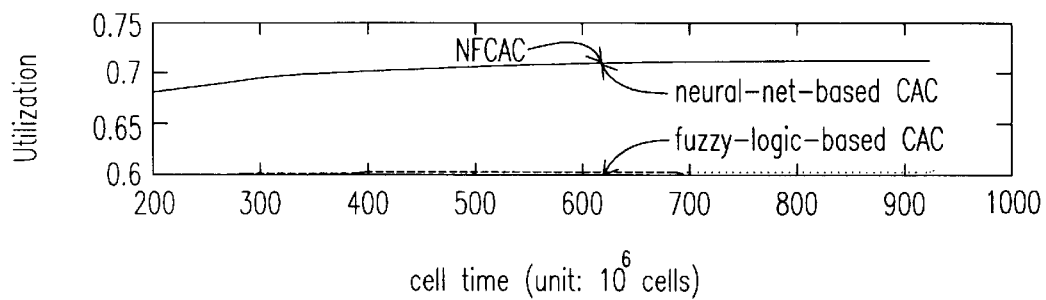
FIG. 5(*a*) is a plot showing a System utilization for a preferred embodiment of a type-1 traffic according to the present invention.
Figure 5B:
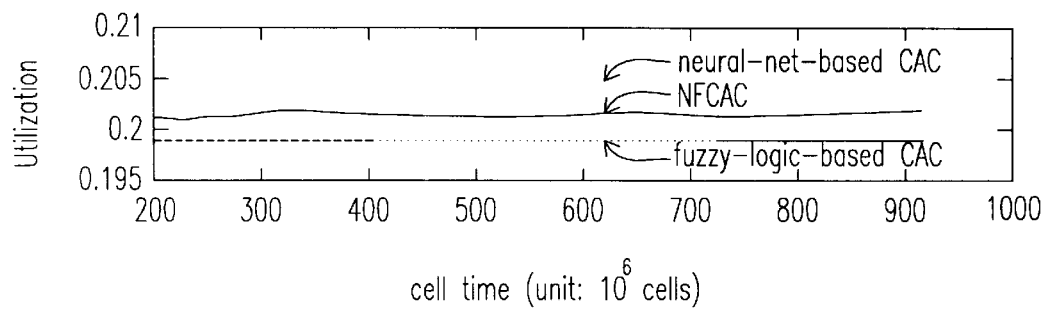
Figure 5C:
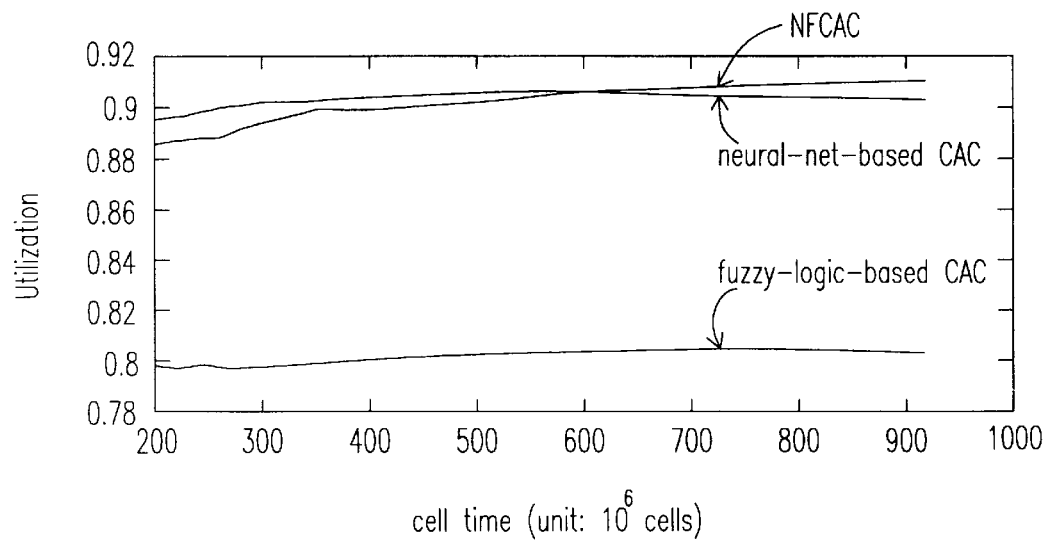
Figure 6A:
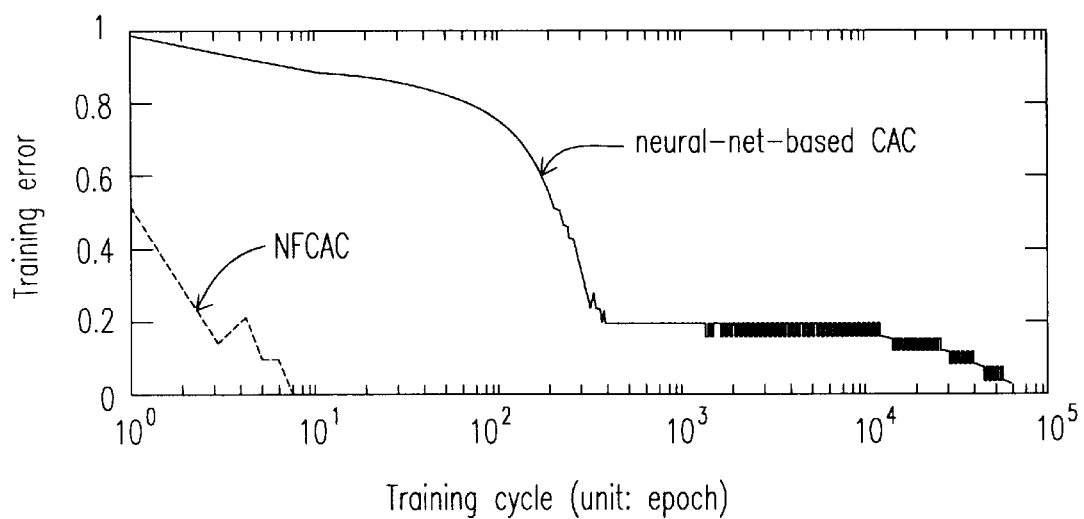
FIG. 6(a) is a plot showing a Training cycles needed for a preferred embodiment of a type-1 traffic according to the present invention.
Figure 6B:
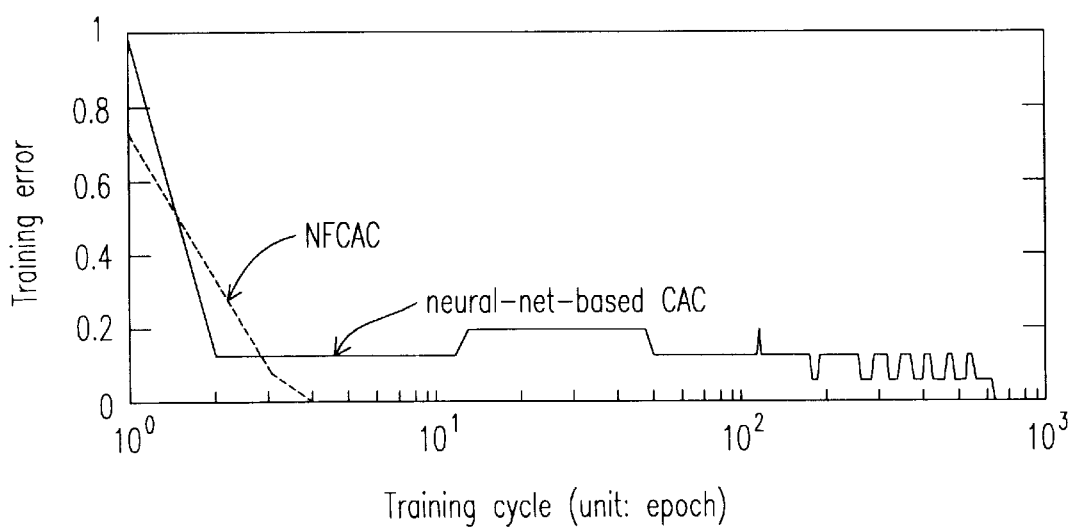
FIG. 6(b) is a plot showing a Training cycles needed for a preferred embodiment of a type-2 traffic according to the present invention.

FIG. 4 shows the cell loss rates of an ATM traffic controller employing fuzzy logic-based CAC scheme proposed in (R. G. Cheng and C. J. Chang, "Design of a fuzzy traffic controller for ATM networks," *IEEE/ACM Trans. Networking*, vol. 4, no. 3, pp. 460–469, June 1996), the neural-net-based CAC scheme and NFCAC proposed in this invention. The neural-net-based CAC scheme here used a three-layered neural network with 30 hidden nodes. It can be found that QoSs of the two types of traffic were guaranteed for all these three control schemes. However, as shown in FIG. 5(a) and FIG. 5(b), NFCAC has the largest system utilization for type-1 traffic than the fuzzy-logic-based CAC and the neural-net-based CAC. FIG. 5(c) shows that the overall system utilization of NFCAC has a little improvement over that of the neural-net-based CAC, and both of the two schemes have about 10% improvement of system utilization comparably with fuzzy-logic-based CAC. Although NFCAC and the neural-net-based CAC provided similar system utilization, the training time required for these two schemes were quite different. FIG. 6(a) and FIG. 6(b) show the training time required for NFCAC and numeral-net-based CAC for the two types of traffic and it is found that NFCAC reduced the training time significantly over the neural-net-based CAC. It is because that the knowledge of conventional control methods can be easily adopted by NFCAC to construct the initial rule structure and the parameters of the membership functions.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A neural fuzzy connection admission controller in a node of an Asynchronous Transfer Mode (ATM) communication network comprising:

first layer nodes each for inputting and storing three parameter inputs of an available capacity $C_a$, a traffic load adjustment parameter y, and a cell loss ratio $P_l$;

second layer nodes fully interconnected with said first layer nodes each for generating fuzzified result signals indicating said available capacity of the system after accepting a new connection, said traffic load adjustment parameter y, and said cell loss ration $P_l$;

third layer nodes fully interconnected with said second layer nodes each representing a fuzzy control rule for training said fuzzified result and performing precondition matchings of each of said fuzzy control rule to generate fuzzy control signals;

fourth layer nodes fully interconnected with said third layer nodes each having two operation modes for executing a down-up operation and a up-down operation, said down-up operation performing a consequence matching of each of said fuzzy control rule for the links, and said up-down operation performing fuzzy OR operation to integrate the fired strength of a fuzzy control rule; and fifth layer nodes consisting of down-up nodes and up-down nodes, each down-up node and its links defuzzifying input data to generate a decision signal $\hat{Z}$, and said up-down nodes for training a desired decision signal Z, and said desired decision signal Z is dynamically updated in response to a performance feedback $P_l$.

2. The neural fuzzy connection admission controller as claimed in claim 1, further comprising:

a bandwidth estimator communicating with said ATM communication network for estimating an equivalent capacity $C_e$ required for said new connection according to a peek bit rate, an average bit rate, and a peak bit rate duration;

a network resource estimator for dynamically updating said current available capacity $C_a$ in response to said equivalent capacity $C_e$;

a system statistics estimator for measuring system statistics of the queue length q, the queue-length change rate $\Delta q$, and the cell loss ratio $P_l$; and a congestion controller communicating with said system statistics estimator for generating a congestion control action y in response to said queue length q, said queue-length change rate $\Delta q$, and said cell loss ratio $P_l$.

3. The neural fuzzy connection admission controller as claimed in claim 1, wherein said cell loss ratio $P_l$, is a system performance feedback for said decision signal $\hat{Z}$.

4. The neural fuzzy connection admission controller as claimed in claim 1, wherein adjacent layers are fully interconnected with variable link weights.

5. The neural fuzzy connection admission controller as claimed in claim 1, wherein each node in each layer has a net input function $f_i^{(k)}(u_{ij}^{(k)})$ and an activation output function $a_i^{(k)}(f_i^{(k)})$, where i representing a node, k a layer, $u_{ij}^{(k)}$ the possible input to the node i in layer k form node j in layer (k-l).

6. The neural fuzzy connection admission controller as claimed in claim 1, wherein each node in said second layer performs a bell-shaped function by means of:

$$f_i^{(2)}(u_{ij}^{(2)}) = -\frac{(u_{ij}^{(2)} - m_{jn}^{(1)})^2}{\sigma_{jn}^{(1)2}} \text{ and } a_i^{(2)} = e^{f_i^{(2)}},$$

where $$u_{ij}^{(2)} = a_j^{(1)}, 1 \leq i \leq 6, j = \left[\frac{i+1}{2}\right],$$

and $m_{jn}^{(1)}$ and $\sigma_{jn}^{(1)}$ representing the mean and the standard deviation of the n-th term of the input linguistic variable from node j in input layer.

7. The neural fuzzy connection admission controller as claimed in claim 1, wherein each node in said third layer performs a fuzzy AND operation defined as $f_i^{(3)}(u_{ij}^{(3)})=\min(u_{ij}^{(3)}; \forall_j \in P_i$ and $a_i^{(3)}=f_i^{(3)}$, where $u_{ij}^{(3)}=a_j^{(2)}$ and $P_i=\{j \mid$ all j that are the precondition nodes of the i-th rule$\}$, $1 \leq i \leq 8$.

8. The neural fuzzy connection admission controller as claimed in claim 1, wherein the down-up operation for each node in said fourth layer performs a function by means of:
$f_i^{(4)}(u_{ij}^{(4)})=\max(u_{ij}^{(4)}; \forall j \in C_i$ and $a_i^{(4)}=f_i^{(4)}$, where $u_{ij}^{(4)}=a_j^{(3)}$ and $C_i=\{j \mid$ all j that have the same consequence of the i-th rule term in the term set of $\hat{Z}\}$, $1 \leq i \leq 4$.

9. The neural fuzzy connection admission controller as claimed in claim 1, wherein the up-down operation for each node in said forth layer performs a bell-function function by means of:

$$f_i^{(4)}(u_{ij}^{(4)}) = -\frac{(u_{ij}^{(4)} - m_j^{(0)})^2}{\sigma_j^{(0)2}} \text{ and } a_i^{(4)} = e^{f_i^{(4)}},$$

where $u_{ij}^{(4)} = a_j^{(5)}$; and $m_j^{(0)}$ and $\sigma_j^{(5)}$ representing the mean and the standard deviation of the j-th term of $\hat{Z}$, $1 \leq i \leq 4$, j=1.

10. The neural fuzzy connection admission controller as claimed in claim 1, wherein said defuzzifying step is performed by means of:

$$f_i^{(5)}(u_{ij}^{(5)}) = \sum_{j=1}^{4} m_j^{(0)} \sigma_j^{(0)} u_{ij}^{(0)} \text{ and } a_i^{(5)} = U\left(\frac{f_i^{(5)}}{\sum_{j=1}^{4} \sigma_j^{(0)} u_{ij}^{(5)}} - z_a\right),$$

where $u_{ij}^{(5)}=a_j^{(4)}$, i=1, $z_a$ indicating a decision threshold, and $$U(x) = \begin{cases} 1 & \text{if } x \geq 0, \\ 0 & \text{otherwise.} \end{cases}$$

11. A method for controlling a connection admission for a new connecting call in a node of an Asynchronous Transfer Mode (ATM) communication network, comprising the steps of:

inputting and storing parameter inputs of available capacity $C_a$, congestion control action y, and cell loss ratio $P_l$ in first layer nodes of a neural fuzzy network;

fuzzifying said parameter inputs in second layer nodes of said neural fuzzy network and then outputting a fuzzified result, said second layer nodes acting as membership functions for three parameter inputs;

training said fuzzified result in third layer nodes of said neural fuzzy network and generating fuzzy control signals, each of said third layer nodes representing a fuzzy rule;

executing a down-up operation and a up-down operation in fourth layer nodes of said neural fuzzy network, said down-up operation performing a consequence matching of said fuzzy control rules and said up-down operation providing a soft admission decision signal;

defuzzifying data in response to a decision signal $\hat{Z}$ for down-up nodes in fifth layer nodes of said neural fuzzy network; and feeding a desired decision signal Z for optimally adjusting link weights for up-down nodes in said fifth layer nodes of said neural fuzzy network, and said desired decision signal Z is updated in response to a performance feedback $P_l$ for up-down nodes in said fifth layer nodes.

12. The method as claimed in claim 11, further comprising the steps of:

estimating the equivalent capacity $C_e$ required for a new connection according to a peek bit rate, an average bit rate, and a peak bit rate duration; and dynamically updating a current available capacity $C_a$ in response to said equivalent capacity $C_e$.

13. The process as claimed in claim 11, further comprising the steps of:

measuring system statistics of a queue length q, a queue-length change rate $\Delta$ q, and said cell loss ratio $P_l$; and computing said congestion control action y according to said queue length q, said queue-length change rate $\Delta$ q, and said cell loss ratio $P_l$.

14. The method as claimed in claim 11, wherein each node in each layer has a net input function $f_i^{(k)}(u_{ij}^{(k)})$ and an activation output function $a_i^{(k)}(f_i^{(k)})$, where i representing a node, k a layer, $u_{ij}^{(k)}$ the possible input to the node i in layer k form node j in layer (k-l).

15. The method as claimed in claim 11, wherein each node in said second layer performs a bell-shaped function by means of:

$$f_i^{(2)}(u_{ij}^{(2)}) = -\frac{(u_{ij}^{(2)} - m_{jn}^{(1)})^2}{\sigma_{jn}^{(1)2}} \text{ and } a_i^{(2)} = e^{f_i^{(2)}},$$

where $u_{ij}^{(2)} = a_j^{(1)}, 1 \leq i \leq 6, j = \left[\frac{i+1}{2}\right],$ and $m_{jn}^{(1)}$ and $\sigma_{jn}^{(1)}$ representing the mean and the standard deviation of the n-th term of the input linguistic variable from node j in input layer.

16. The method as claimed in claim 11, wherein each node in said third layer performs a fuzzy AND operation defined as $$f_i^{(3)}(u_{ij}^{(3)}) = \min(u_{ij}^{(3)}; \forall_j \in P_i)$$

and $a_i^{(3)}=f_i^{(3)}$, where $u_{ij}^{(3)}=a_j^{(2)}$ and $P_i=\{j \mid$ all j that are the precondition nodes of the i-th rule$\}$, $1 \leq i \leq 8$.

17. The method as claimed in claim 11, wherein the down-up operation for each node in said fourth layer performs a function by means of:

$f_i^{(4)}(u_{ij}^{(4)}) = \max(u_{ij}^{(4)}; \forall j \in C_i)$ and $a_i^{(4)}$, where $u_{ij}^{(4)} = a_j^{(3)}$ and $C_i = \{j \mid \text{all } j \text{ that have the same consequence of the i-th rule term in the term set of } \hat{Z}\}$, $1 \leq i \leq 4$.

18. The method as claimed in claim 11, wherein the up-down operation for each node in said forth layer performs a bell-function function by means of:

$$f_i^{(4)}(u_{ij}^{(4)}) = -\frac{(u_{ij}^{(4)} - m_j^{(0)})^2}{\sigma_j^{(0)2}}$$

and $a_i^{(4)} = e^{f_i^{(4)}}$, where $u_{ij}^{(4)} = a_j^{(5)}$, and $m_j^{(0)}$ and $\sigma_j^{(5)}$ representing the mean and the standard deviation of the j-th term of $\hat{Z}$, $1 \leq i \leq 4$, $j=1$.

19. The method as claimed in claim 11, wherein said defuzzifying step is performed by means of:

$$f_i^{(5)}(u_{ij}^{(5)}) = \sum_{j=1}^{4} m_j^{(0)} \sigma_j^{(0)} u_{ij}^{(0)} \text{ and } a_i^{(5)} = U\left(\frac{f_i^{(5)}}{\sum_{j=1}^{4} \sigma_j^{(0)} u_{ij}^{(5)}} - z_a\right),$$

where $u_{ij}^{(5)} = a_j^{(4)}$, $i = 1$ $z_a$ indicating a decision threshold, and $$U(x) = \begin{cases} 1 & \text{if } x \geq 0, \\ 0 & \text{otherwise.} \end{cases}$$

* * * * *